United States Patent
Fukui et al.

(10) Patent No.: US 9,886,646 B2
(45) Date of Patent: Feb. 6, 2018

(54) IMAGE PROCESSING APPARATUS AND NON-TRANSITORY COMPUTER READABLE MEDIUM

(71) Applicant: FUJI XEROX CO., LTD., Tokyo (JP)

(72) Inventors: Motofumi Fukui, Kanagawa (JP); Ryota Ozaki, Kanagawa (JP); Noriji Kato, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 11 days.

(21) Appl. No.: 15/211,647

(22) Filed: Jul. 15, 2016

(65) Prior Publication Data

US 2017/0243077 A1    Aug. 24, 2017

(30) Foreign Application Priority Data

Feb. 18, 2016    (JP) .................. 2016-029066

(51) Int. Cl.
*G06K 9/46* (2006.01)
*G06K 9/62* (2006.01)

(52) U.S. Cl.
CPC ......... *G06K 9/4671* (2013.01); *G06K 9/6267* (2013.01)

(58) Field of Classification Search
None
See application file for complete search history.

(56) References Cited

U.S. PATENT DOCUMENTS

2012/0201464 A1* 8/2012 Fukui .................. G06K 9/6221
382/195

2014/0198980 A1* 7/2014 Fukui .................. G06K 9/00677
382/159
2016/0371536 A1* 12/2016 Yamaji ............... G06K 9/00677

FOREIGN PATENT DOCUMENTS

| JP | 2003-256427 A | | 9/2003 |
| JP | 2003256427 A | * | 9/2003 |
| JP | 2006-099565 A | | 4/2006 |
| JP | 2009-289189 A | | 12/2009 |
| JP | 2009289189 A | * | 12/2009 |
| JP | 2010-102396 A | | 5/2010 |
| JP | 2012-164226 A | | 8/2012 |

(Continued)

OTHER PUBLICATIONS

Object Detection with Discriminatively Trained Part Based Models. Pedro F. Felzenszwalb, Ross B. Girshick, David McAllester and Deva Ramanan. 2009.*

(Continued)

*Primary Examiner* — Delomia L Gilliard
(74) *Attorney, Agent, or Firm* — Oliff PLC

(57) ABSTRACT

An image processing apparatus includes a unifying unit, a memory, a storing unit, a setting unit, a selecting unit, an extracting, and a determining unit. The unifying unit unifies images of identification target regions cut out from a learning image. The memory stores a learning model. The storing unit stores identification target images converted into images of different image sizes. The setting unit sets a position and a size of a candidate region which is likely to include an identification target object of an identification target image. The selecting unit selects an identification target image of an image size with which the size of the cut-out candidate region is closest to the fixed size. The extracting unit extracts the information. The determining unit determines a target object included in the image of the candidate region.

12 Claims, 18 Drawing Sheets

(56) References Cited

FOREIGN PATENT DOCUMENTS

| JP | 2012164226 A | * | 8/2012 | ........... G06K 9/6221 |
| JP | 2014-135014 A | | 7/2014 | |

OTHER PUBLICATIONS

Discriminative Training for Object Recognition Using Image Patches.Thomas Deselaers, Daniel Keysers, and Hermann Ney. 2005.*

Selective Search for Object Recognition. J.R.R. Uijlings et al. 2012.*

Pedro Felzenszwalb et al. "Object Detection with Discriminatively Trained Part Based Models," PAMI, 2010, pp. 1-20.

J.R.R. Uijlings et al. "Selective Search for Object Recognition," IJCV, 2013, pp. 1-14.

* cited by examiner

LEARNING IMAGE

Y1 = 25, Y2 = 50, Y3 = 100 PIXELS

X = 50 PIXELS

Z1 = X / Y1 = 50 / 25 = 2.0

Z2 = X / Y2 = 50 / 50 = 1.0

Z3 = X / Y3 = 50 / 100 = 0.5

(IDENTIFICATION TARGET IMAGE)

IMAGE PROCESSING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2016-029066 filed Feb. 18, 2016.

BACKGROUND

Technical Field

The present invention relates to an image processing apparatus and a non-transitory computer readable medium.

SUMMARY

According to an aspect of the invention, there is provided an image processing apparatus including a unifying unit, a memory, a storing unit, a setting unit, a selecting unit, an extracting, and a determining unit. The unifying unit unifies images of identification target regions cut out from a learning image for which a state on whether or not van identification target object is included is already known to a predetermined fixed size. The memory stores a learning model which is generated based on feature information extracted from images of the identification target regions that have been unified to the fixed size by the unifying unit and used for determining a probability that the target object is included in the images. The storing unit stores identification target images converted into images of different image sizes. The setting unit sets a position and a size of a candidate region which is likely to include ah identification target, object of an identification target image. The selecting unit selects, in a case where the candidate region at the position and of the sire set by the setting unit is cut out from the identification target images of the different image sires stored in the storing unit, an identification target image of an image size with which the sire of the cut-out candidate region is closest to the fixed sire to which the images of the identification target regions are unified when the learning model is generated. The extracting unit extracts, from the identification target image of the image size selected by the selecting unit, feature information indicating a feature of the image of the candidate region at the position and of the size set by the setting unit. The determining unit determines a target object included in the image of the candidate region, based on the feature information extracted by the extracting unit and the learning model stored in the memory.

BRIEF DESCRIPTION OF THE DRAWINGS

Exemplary embodiments of the present invention will be described in detail based on the following figures, wherein.

DETAILED DESCRIPTION

Exemplary embodiments of the present invention will be described below with reference to drawings.

Figure 1:
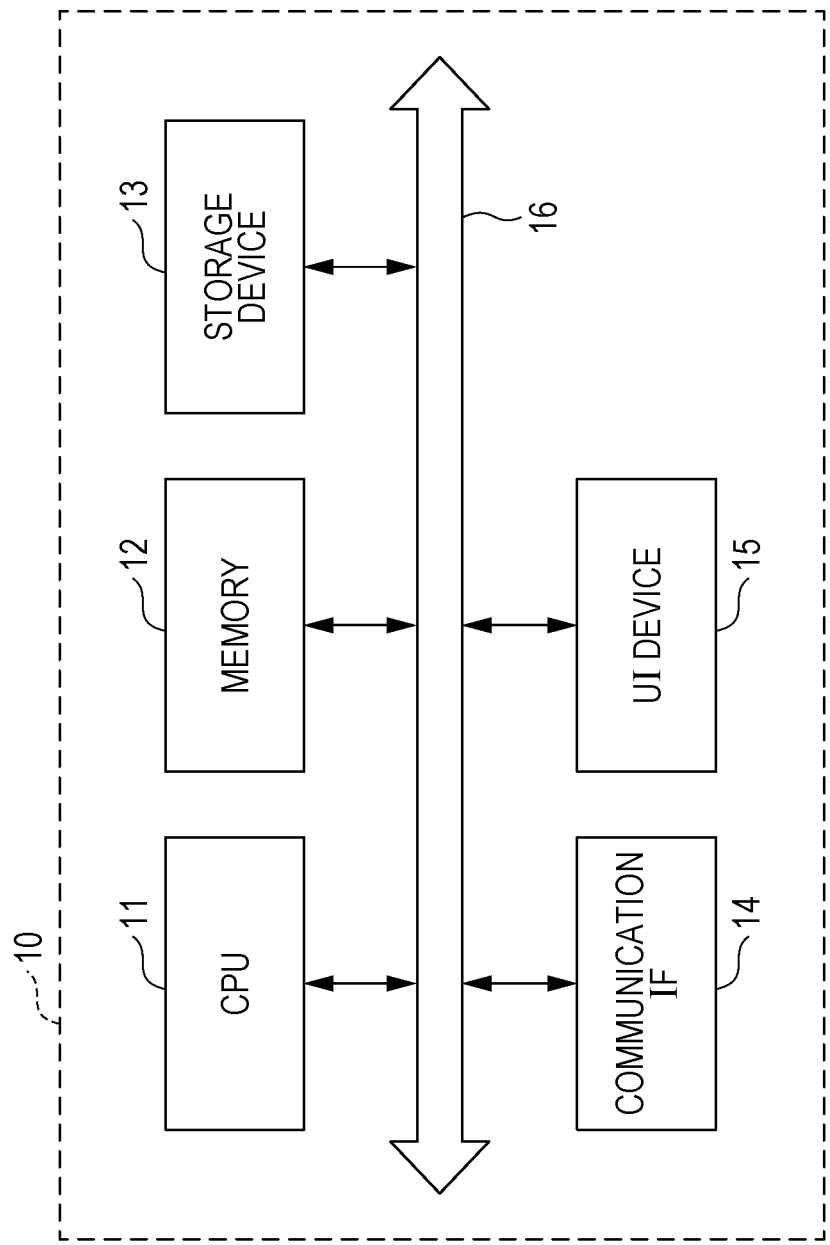
FIG. 1 is a block diagram illustrating a hardware configuration of an image processing apparatus according to an exemplary embodiment of the present invention.

FIG. 1 is a block diagram illustrating a hardware configuration of an image processing apparatus 10 according to an exemplary embodiment of the present invention.

The image processing apparatus 10 according to the exemplary embodiment includes, as illustrated in FIG. 1, a central processing unit (CPU) 11, a memory 12, a storage device 13 such as a hard disk drive (HDD), a communication interface (IF) 14 which performs transmission and reception of data to and from an external, apparatus via a network, and a user interface (UI) device 15 including a touch panel or a liquid crystal display and a keyboard. The above components are connected to one another via a control bus 16.

The CPU 11 executes a predetermined process based on a control program stored in the memory 12 or the storage device 13, and controls an operation of the image processing apparatus 10. In this exemplary embodiment, explanation is provided in which the CPU 11 reads the control program stored in the memory 12 or the storage device 13 and executes the read control program. However, the program may be stored in a storing medium such as a compact disc-read only memory (CD-ROM) and supplied to the CPU 11.

Figure 2:
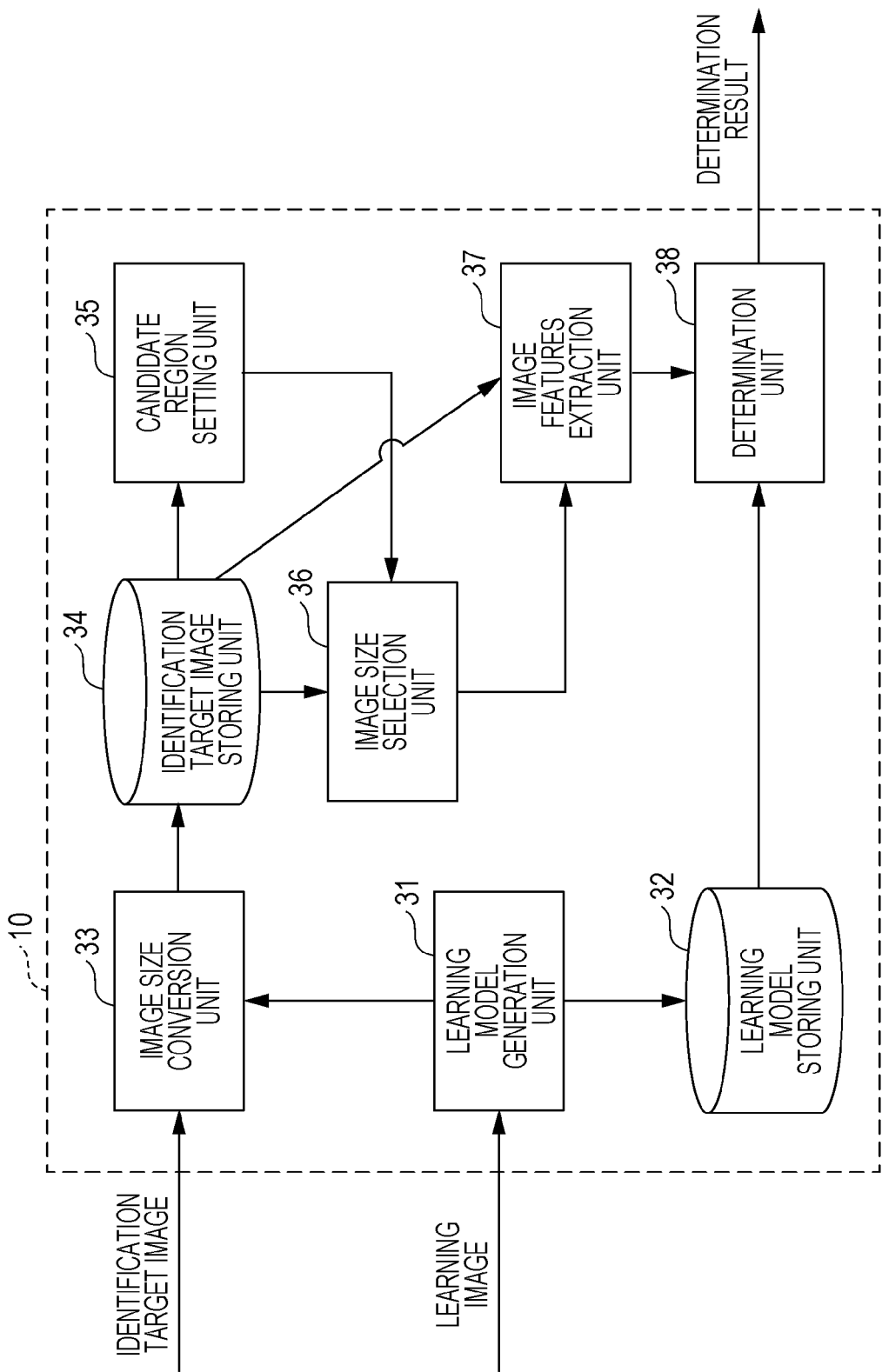
FIG. 2 is a block diagram illustrating a functional configuration of an image processing apparatus according to an exemplary embodiment of the present invention.

FIG. 2 is a block diagram illustrating a functional configuration of the image processing apparatus 10 implemented by execution of the above control program.

As illustrated in FIG. 2, the image processing apparatus 10 according to this exemplary embodiment includes a learning model generation unit 31, a learning model storing unit 32, an image size conversion unit 33, an identification target image storing unit 34, a candidate region setting unit 35, an image sire selection unit 36, an image features extraction unit 37, and a determination unit 38.

The learning model, generation unit 31 unifies images of identification target regions (interest regions) cut out from a learning image for which a state on whether or not an identification target object (target object) is included is already known to a predetermined fixed size. The learning model generation unit 31 extracts image features (feature information) from images of identification target regions which have been unified to the predetermined fixed size to generate a learning model.

Figure 3:
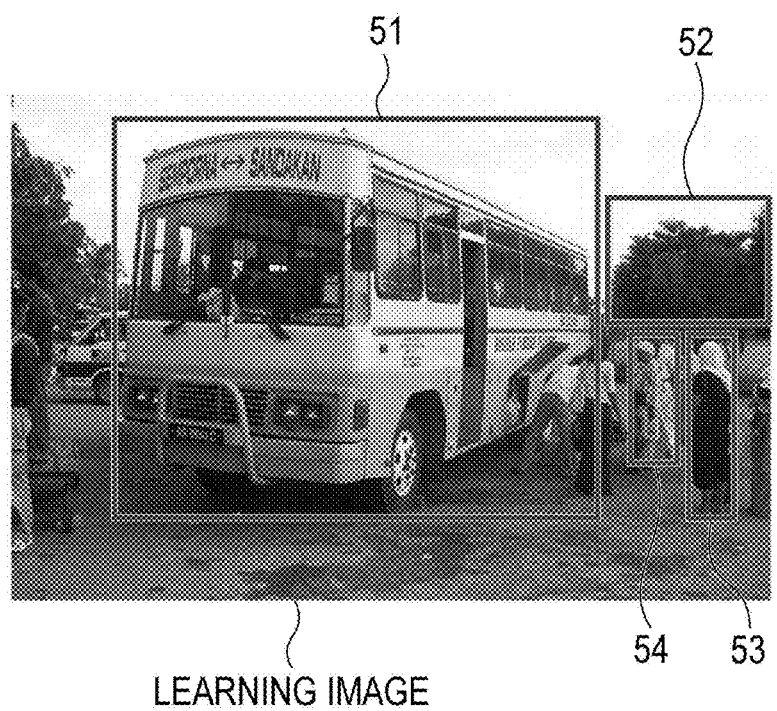
FIG. 3 illustrates an example of a learning image and identification target regions.

An example of a learning image and identification target regions is illustrated in FIG. 3. In FIG. 3, identification target regions 51 to 54 surrounding images of a bus, a tree, and people are set in a learning image. As a method for setting, for a learning image, the position and size of an identification target region and providing label information indicating the details of the image of the identification target region, a method based on a manual operation may be considered.

For example, label information of "bus" is provided to an image of the identification target region 51, label information of "tree" is provided to an image of the identification target region 52, and label information of "person" is provided to images of the identification target regions 53 and 54.

As label information, not only object, names such as "dog", "tree", and "car" but sensitivity expressions such as "cute", "red", and "big" or scenery names such as "outdoor", "sky", and "sea" may also be used.

Furthermore, one piece of label information may not be provided to an image of a single identification target region. Plural pieces of label information may be provided to a single image.

Figure 4:
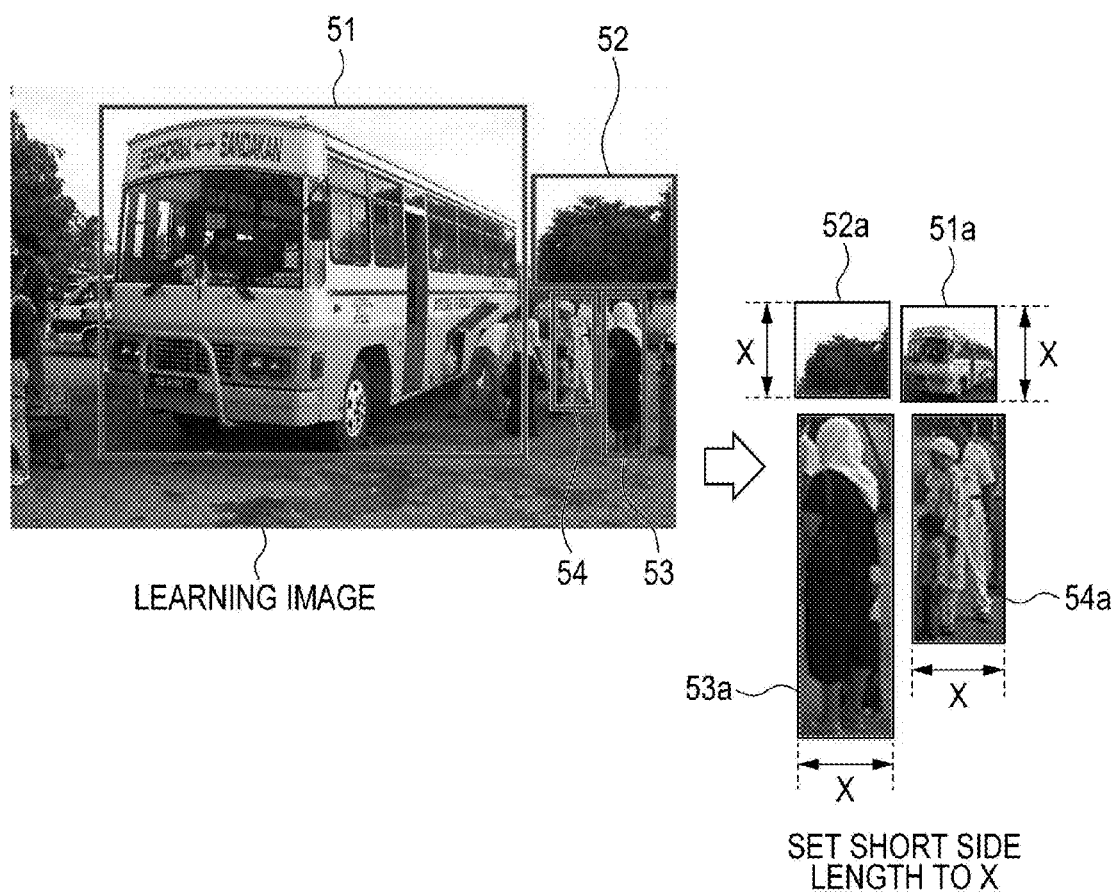
FIG. 4 is a diagram for explaining a state in which images of the identification target regions are cut out from the learning image.

Next, the learning model generation unit 31 performs enlargement or reduction processing for unifying images cut out from identification target regions set as described above to a predetermined fixed sire. For example, in the case where an identification target region has a rectangular shape, the learning model generation unit 31 performs enlargement or reduction processing for setting the short side length (short side sire) of an image of an identification target region cut out from an learning image to have a predetermined length X, as illustrated in FIG. 4. At this time, the learning model generation unit 31 performs enlargement or reduction processing for an image of an identification target region so that an aspect ratio is maintained.

In the description provided below, explanation will be given based on the assumption that the learning model generation unit 31 enlarges or reduces an image so that the short side length of an image cut out from an identification target region of a learning image has 50 pixels.

Then, the learning model generation, unit 31 extracts image features from the images of the identification target regions whose short side length is unified to 50 pixels. As the image features, local features and regional features may be used.

In the case where local features are used as image features, a bag of features (BOF), which is a histogram of local features, may be created for each identification target region and used as image features. Furthermore, in the case where an image feature is extracted from a partial region of an image and the center of the partial region is present within an identification target region, the image feature may be selected (as regional features). A partial region of an image represents, for example, a Superpixel created by regional division or a region obtained by dividing the original image in a grid manner. In the case where such regional features are used as image features, multiple image features are extracted from a single identification target region.

Here, the value of X (=50 pixels), to which identification target regions are unified, is output to the image size conversion unit 33.

Furthermore, as a specific example of image features extracted from an image, color information or edge information extracted from image data, histogram information of a gradient direction called "scale-invariant feature transform (SIFT), and the like may be used. Furthermore, the average color value of individual pixels in an identification target region may be used as image features.

Figure 5:
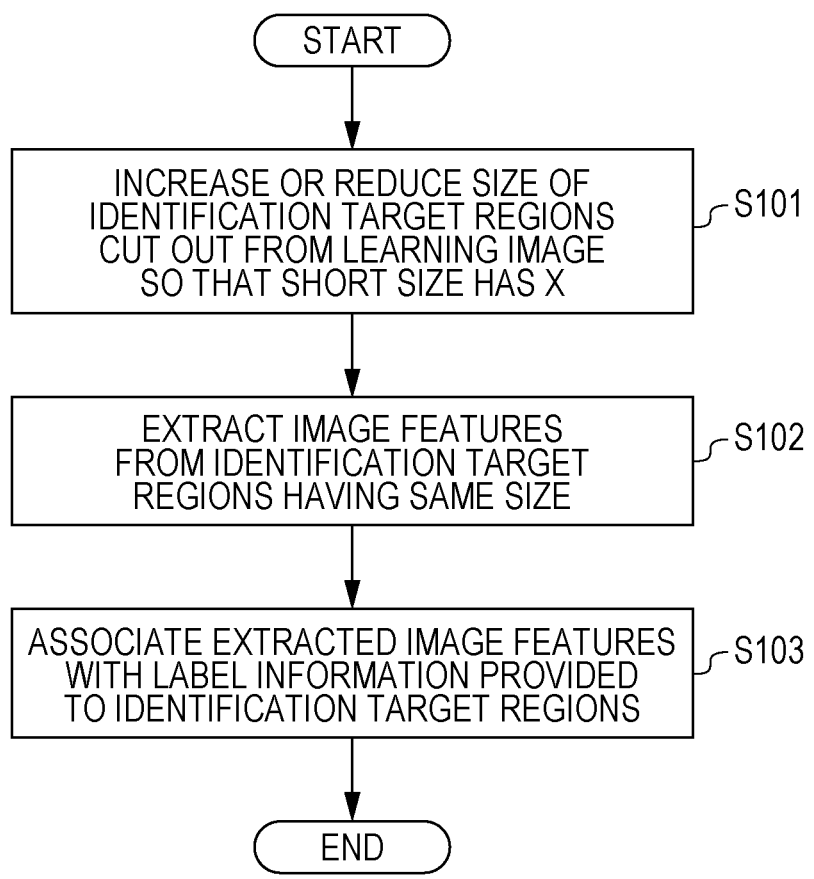
FIG. 5 is a flowchart for explaining the flow of a process for extracting, by a learning model generation unit, image features from identification target regions of a learning image.

The flow of a process for extracting image features from identification target regions of a learning image by the learning model generation unit 31 will be described below with reference to a flowchart of FIG. 5.

As described above, the learning model generation unit 31 increases or reduces the size of each identification target region cut out from a learning image so that a short side has X (for example, 50 pixels) (step S101). Next, the learning model generation unit 31 extracts image features, from the identification target regions whose short side is unified to X (step S102). Then, the learning model generation unit 31 associates the extracted image features with label information provided to the identification target regions (step S103).

Then, the learning model generation unit 31 generates a learning model for determining the possibility that a target object is included in an image, on the basis of the extracted image features of the identification target regions and the label information provided to the identification target, regions.

As a learning model, a generation model of an identifier such as a support vector machine (SVM), adaptive boosting (Adaboost), and kNN, a naïve bays classifier, or the like may be used.

In the case where an identifier is used as a learning model, a conditional probability $P(c|f)$ (or $P(f|c)$) of label information c for the case where an image feature f (or image features F in the case where multiple image features are extracted from a single identification target region) is provided may foe calculated. Furthermore, in the case where a generation model ($P(f|c)$) is generated instead of an identifier as a learning model, $P(c|f)$ may be obtained based on Bayes' theorem.

With the above learning model, based on an image feature as an input, a score which represents a degree in which a certain identification target object is included in an image is calculated.

For example, a learning model in which an identification target object is a "dog", the probability that the image includes an image of a "dog" is calculated as a score.

Figure 6:
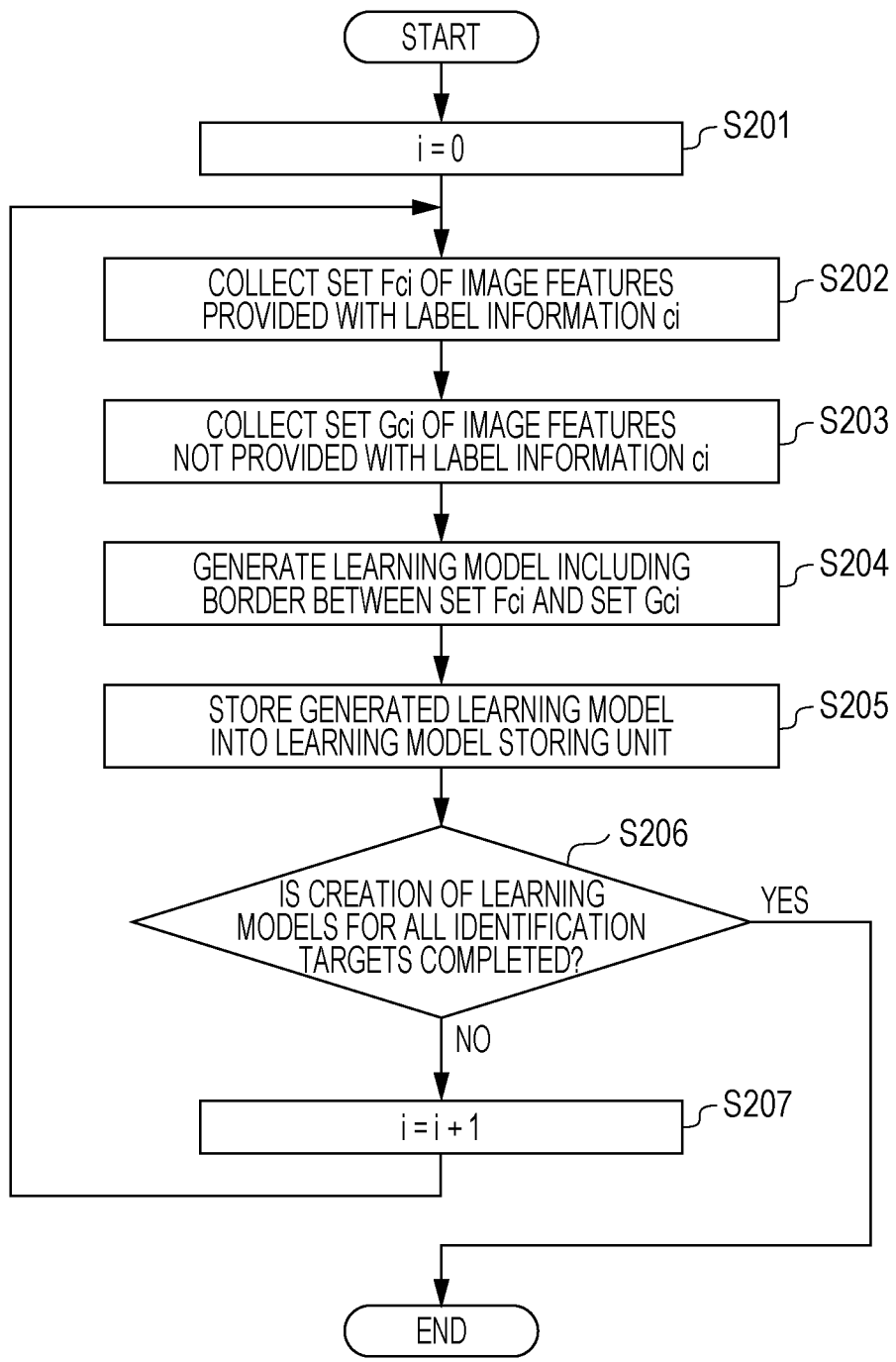
FIG. 6 is a flowchart for explaining a process for generating, by the learning model generation unit, a learning model based on an image feature extracted from each identification target region.

Next, a process for generating, by the learning model generation unit 21, a leaning model based on image features extracted from individual identification target regions will be described below with reference to a flowchart of FIG. 6. The flowchart illustrated in FIG. 6 illustrates the flow of a process for the case where an SVM is generated as a learning model.

In the description provided below, a case where multiple learning models for determining various identification target objects are generated will be explained. A case where multiple learning models including, for example, a learning model for determining the possibility that an image of a "dog" is included in an identification target image, a learning model for determining the possibility that an image of a "cat" is included in an identification target image, and a learning model for determining the possibility that an image of a "person" is included in an identification target image.

First, the learning model generation unit 31 sets the value of i which represents the type of an identification target object to 0 (step S201). For example, explanation will be provided based on the assumption that an identification target object is a "dog" when i is 0.

Then, the learning model generation unit 31 collects a set Fc0 of Image features provided with label information c0, that is, information indicating "dog" as label information (step S262). Furthermore, the learning model generation unit 31 collects a set Gc0 of image features not provided with the label information c0, that is, information indicating "dog" as label information (step S203).

Next, the learning model generation, unit 31 generates a learning model which includes a border between the set Fc0 of image features provided with the label information indicating "dog" and the set Gc0 of image features provided with label information not indicating "dog" (step S204).

Then, the learning model generation unit 31 causes the generated learning model to be stored in the learning model storing unit 32 (step S205).

Then, in the case where creation of learning models for ail the identification targets is completed (Yes in step S206), the learning model generation unit 31 ends the process. In the case where creation of learning models for all the identification targets is not completed (No in step S206), the learning model generation unit 31 increments i by one (step S207) and repeats the processing of steps S202 to S206.

Figure 7:
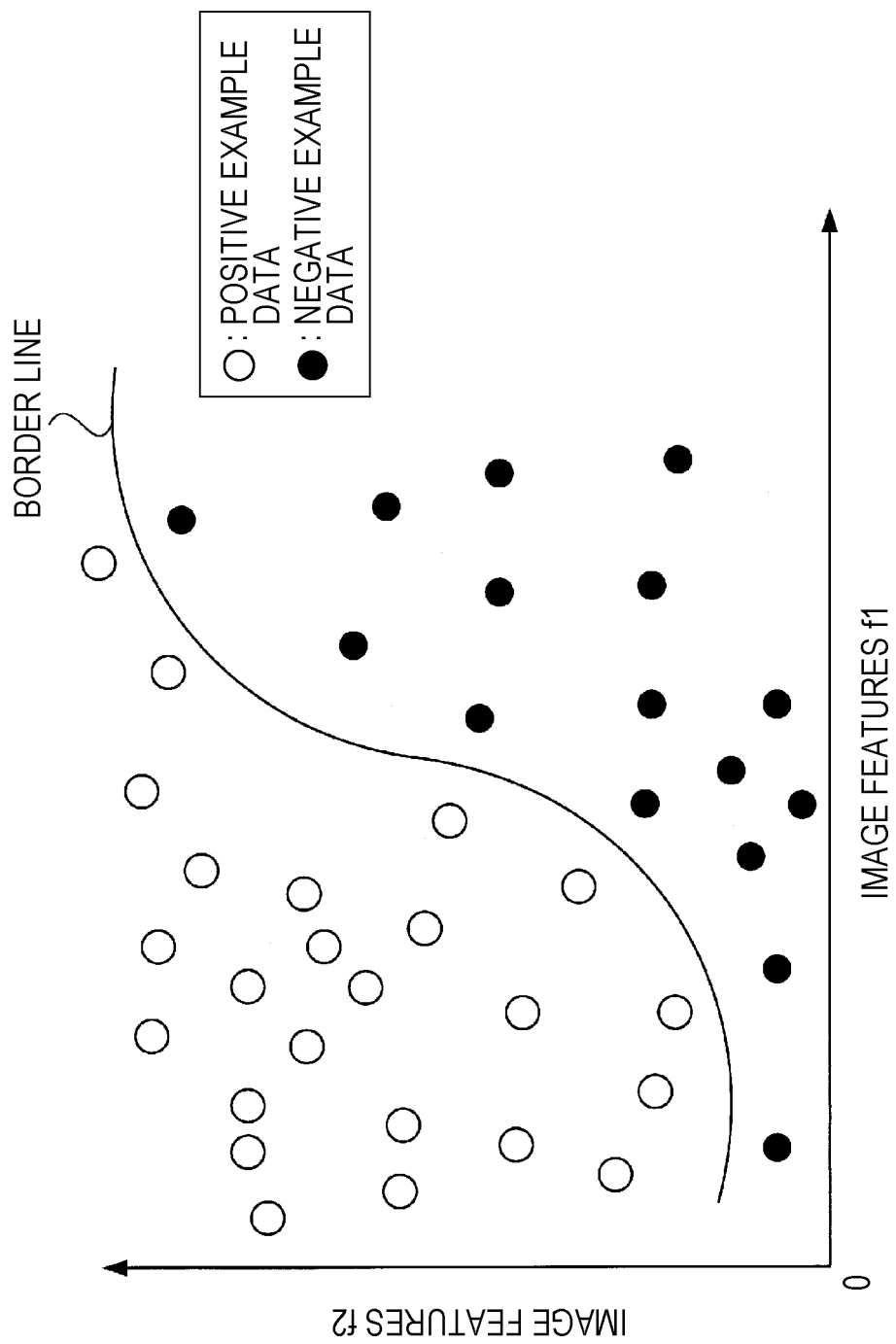
FIG. 7 illustrates an example of a learning model generated by the learning model generation unit.

An example of a learning model generated as described above is illustrated in FIG. 7. Referring to FIG. 7, in a two-dimensional data space represented by two image features f1 and f2 for the sake of a simpler explanation, positive example data, which is image data including an identification target object, and negative example data, which is image data not including the identification target object, exist.

In the leaning model example illustrated in FIG. 7, a border line between the positive example data and the negative example data is provided. It may be determined, by comparing the values of the image features f1 and f2 of a determination target image with the learning model, whether the determination target image is an image including an identification target object or an image not including the identification target object.

The learning model storing unit 32 stores a learning model generated by the learning model generation unit 31.

The image size conversion unit 33 converts an identification target image to which label information is not provided into images of different sizes in advance. The image size conversion unit 33 may convert an identification target image into images of specific sizes set in advance. Alternatively, the identification target image may be converted into images of plural image sizes which are determined automatically in accordance with the degree of variations in the image size of candidate regions in the identification target image.

In the case where plural image sizes into which an identification target image is to be converted are determined in accordance with the degree of variations in the image size of candidate regions in the identification target image, the image size conversion unit 33 may determine the plural image sizes into which the identification target image is to foe converted based on a maximum value and a minimum value of the images sizes of the candidate regions in the identification target image.

Furthermore, the image size conversion unit 33 may enlarge or reduce an identification target image at a magnification with which the image size of a candidate region in an identification target image with a high frequency is set as a fixed size to which images of identification target regions are unified in the case of generating a learning model.

Furthermore, the image size conversion unit 33 may enlarge or reduce an identification target image at a magnification with which a size for equally dividing the number of images of identification target regions cut out from a learning image is set as a fixed size to which images of identification target regions are unified in the case of generating a learning model.

The identification target image storing unit 34 stores identification target images obtained by conversion into images of different image sizes.

A method for determining, by the image sire conversion unit 33, plural magnifications at which an identification target image is converted into images of different image sizes in advance will be explained below with reference to FIGS. 8 to 14.

Figure 8:
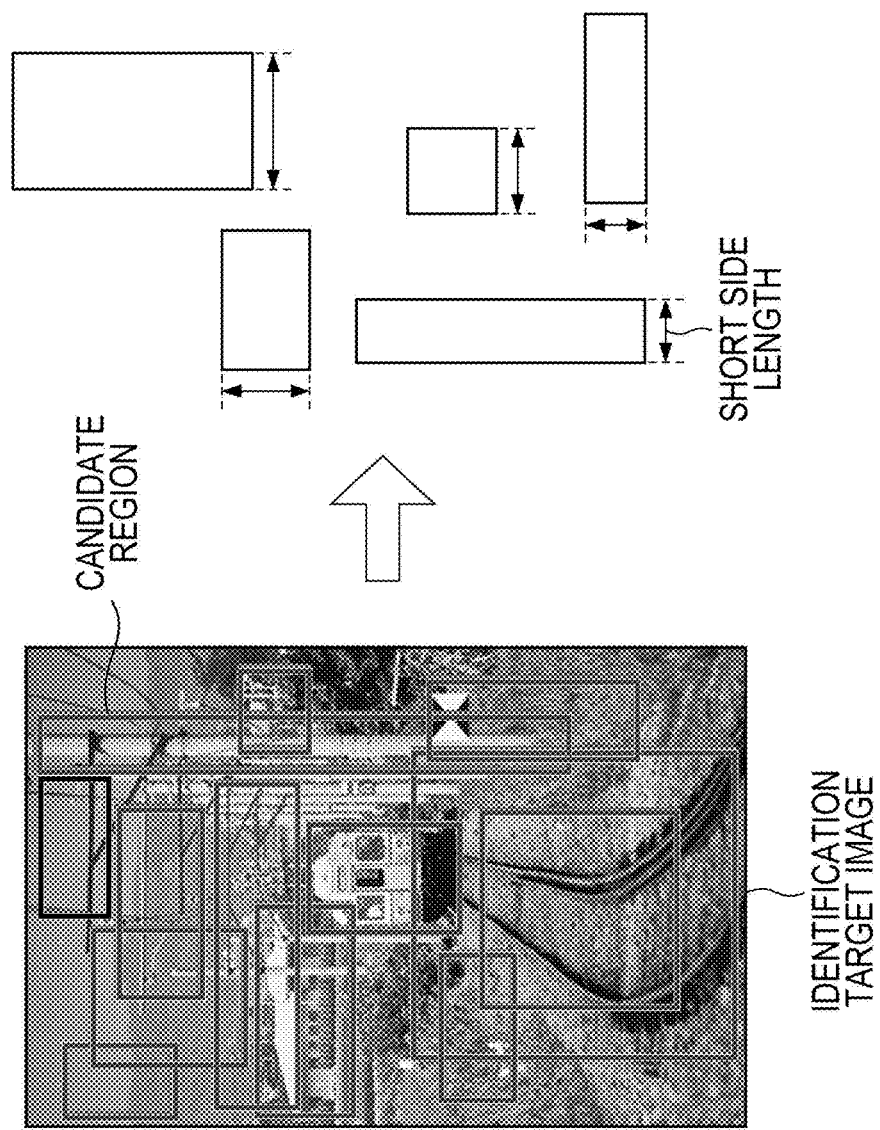
FIG. 8 illustrates an example of an identification target image and candidate regions.
Figure 9:
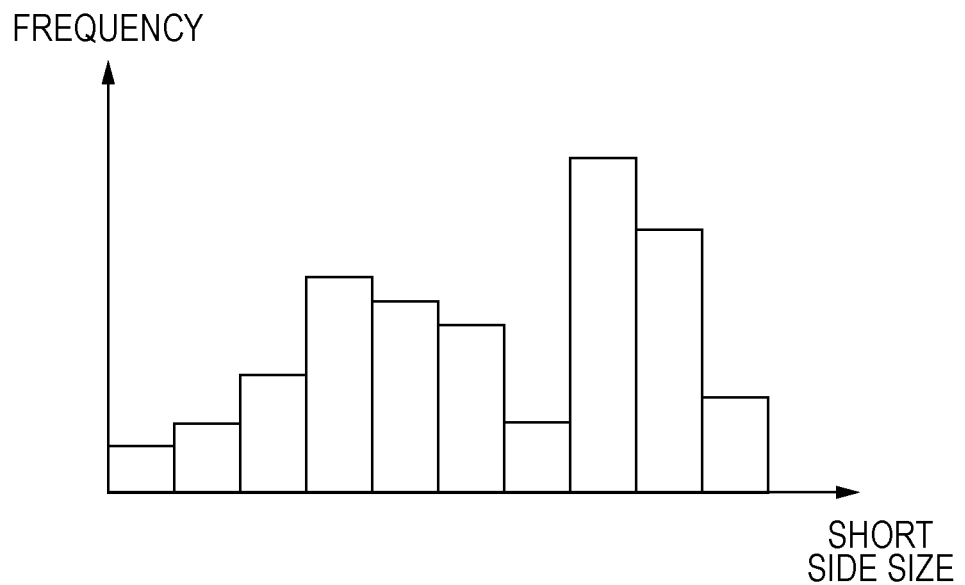
FIG. 9 illustrates an example of a frequency distribution of the short side length of candidate regions generated by an image size conversion unit.

First, an example of an identification target image and candidate regions is illustrated in FIG. 8. FIG. 8 illustrates a case where a large number of candidate regions are extracted from an identification target image including an image of a train. First, the image size conversion unit 33 creates a histogram (frequency distribution) of the short side length (short side size) of multiple candidate regions extracted from the identification target image as described above.

An example of the frequency distribution of the short side length of the candidate regions generated by the image size conversion unit 33 as described above is illustrated in FIG. 9. In the graph illustrated in FIG. 9, the horizontal axis represents the short side length of the candidate regions and the vertical axis represents the frequency (the number of short side lengths).

In the case where a frequency distribution of the short side length of candidate regions is generated, the frequency distribution may be generated using only the short side length of candidate regions extracted from a single identification target image or using the short side length of a large number of candidate regions extracted from plural identification target images.

Here, the image size conversion unit 33 calculates a magnification for reducing or enlarging an identification target image based on the frequency distribution of snort side lengths and the value of X to which the sizes of identification target regions transmitted from the learning model generation unit 31 are unified.

In the description provided below, explanation will be given for the case where the image size conversion unit 33 converts an identification target image into images of three different image sizes.

Figure 10:
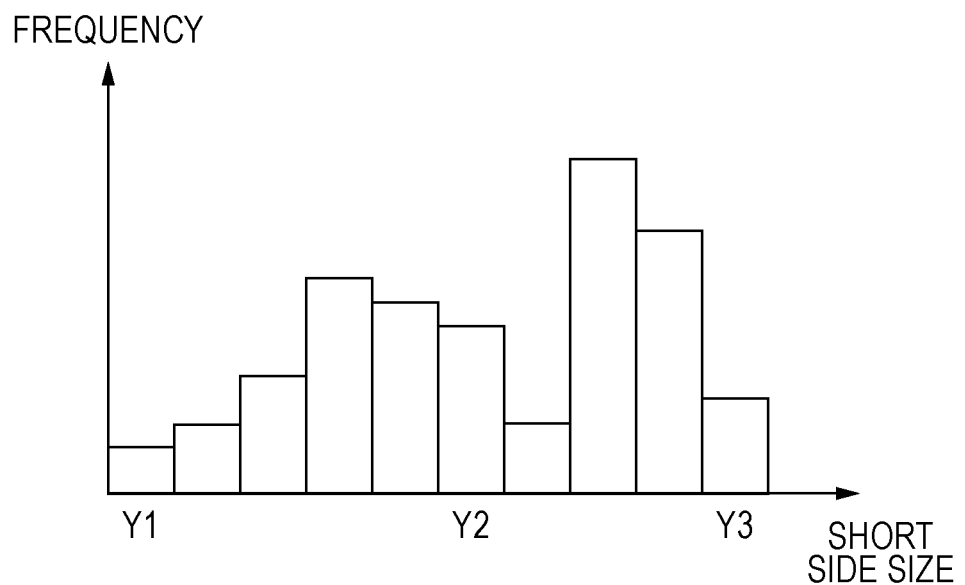
FIG. 10 is a diagram for explaining a state in which a minimum value, an intermediate value, and a maximum value in a frequency distribution of the short side length of the candidate regions are obtained as Y1, Y2, and Y3, respectively.

For example, as illustrated in FIG. 10, the image size conversion unit 33 obtains a minimum value, an intermediate value, and a maximum value in the frequency distribution of the short side length of the candidate regions as $Y1$, $Y2$, and $Y3$, respectively. In this example, explanation is given for a case where $Y1=25$ (pixels), $Y2=50$ (pixels), and $Y3=100$ (pixels) are obtained.

The image size conversion unit 33 calculates magnifications $Z1$, $Z2$, and $Z3$ for enlarging or reducing identification target images by using an equation: $Zk=X/Yk$ ($k=1$ to 3).

Figure 11:
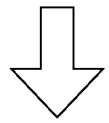
FIG. 11 is a diagram, for explaining a calculation example at a magnification of Z1, Z2, and Z3.
Figure 12:
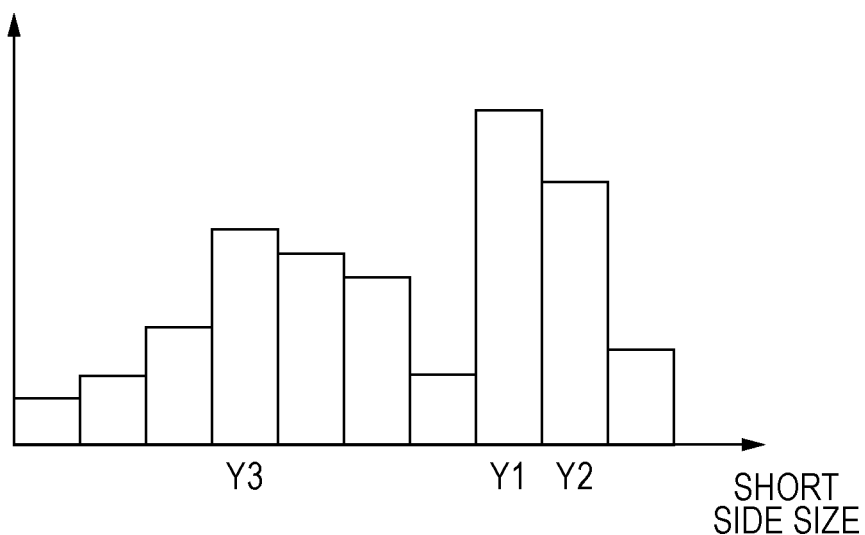
FIG. 12 is a diagram for explaining a state in which three short side lengths with high frequency are obtained as Y1, Y2, and Y3 from a graph of the frequency distribution of the short side length of the candidate regions.

In this case, the short side length X for the case where the sizes of identification target regions are unified is 50 pixels. Therefore, as illustrated in FIG. 11, the magnifications $Z1$, $Z2$, and $Z3$ are calculated as 2.0, 1.0, and 0.5, respectively.

Figure 13:
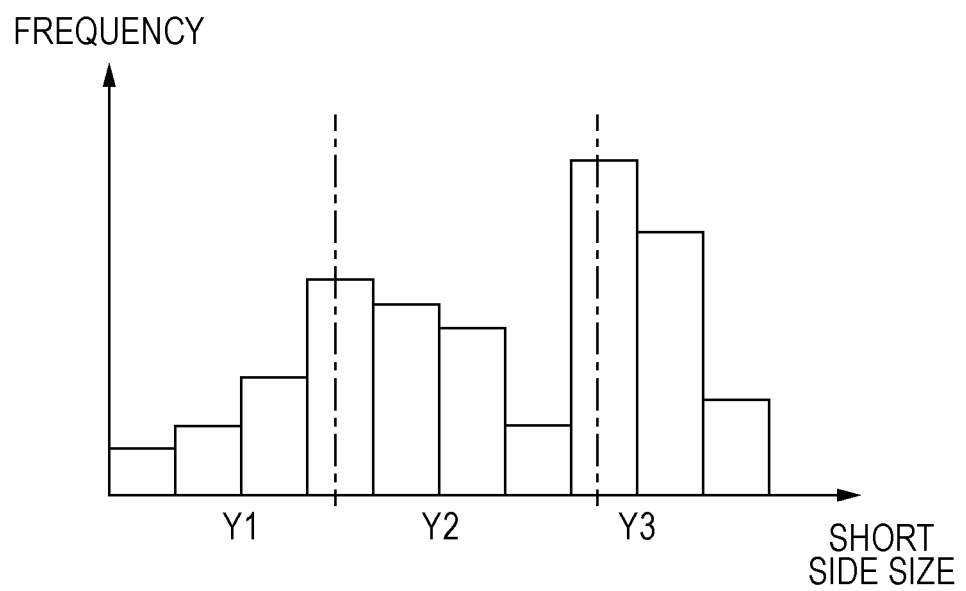
FIG. 13 is a diagram for explaining a state in which the number of snort side lengths in the graph of the frequency distribution of the short side length of the candidate regions is equally divided into three and average values of the short side lengths in the three divided sections are obtained as Y1, Y2, and Y3.

Furthermore, as illustrated in FIG. 13, the image size conversion unit 33 may obtain three short side lengths with high frequency as $Y1$, $Y2$, and $Y3$ from the graph of the frequency distribution of the short side length of the candidate regions.

Furthermore, as illustrated in FIG. 13, the image size conversion unit 33 may equally divide the number of short side lengths in the graph of the frequency distribution of the short side length of the candidate regions into three to obtain average values of the short side lengths in the divided three sections as $Y1$, $Y2$, and $Y3$.

Figure 14:
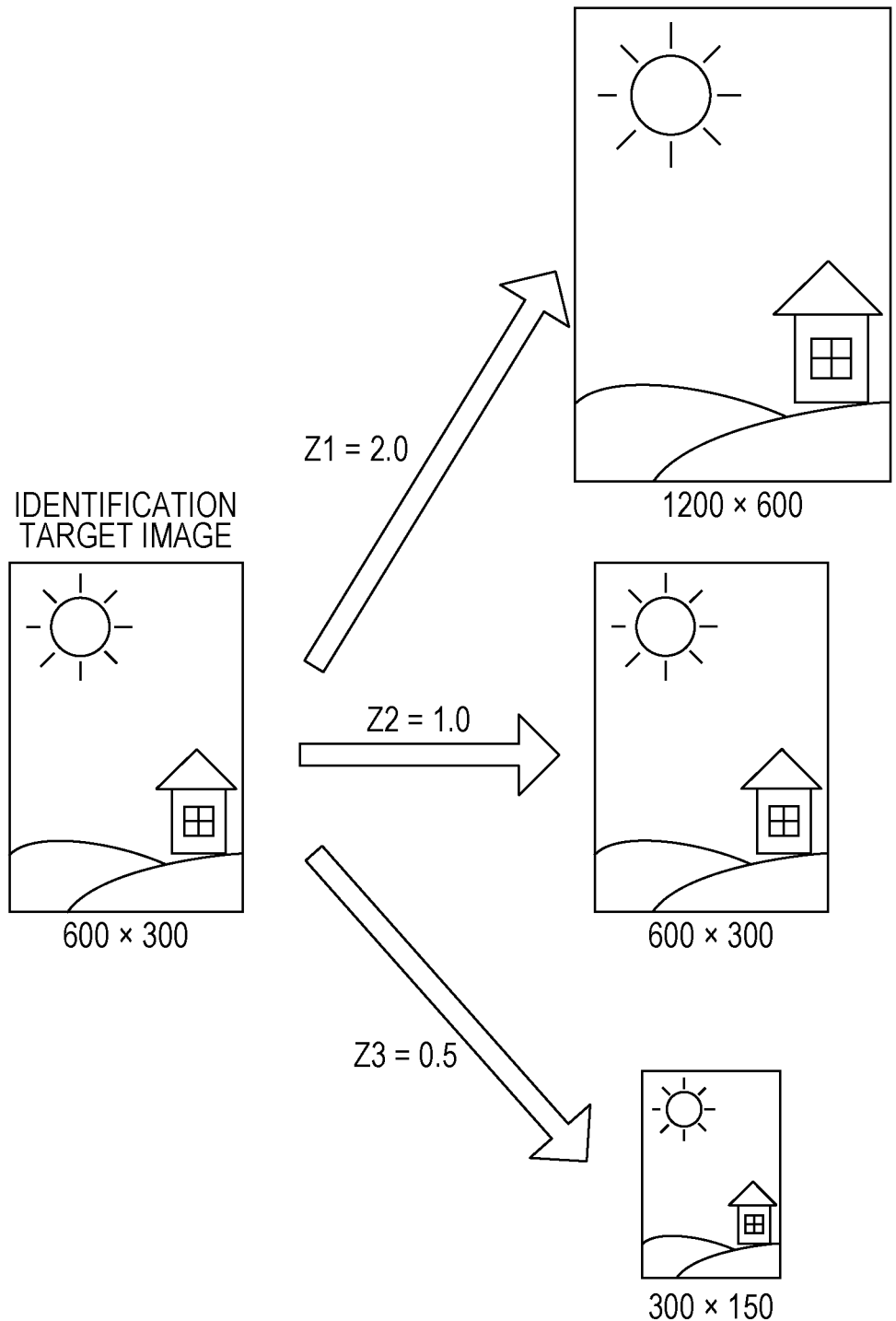
FIG. 14 is a diagram, for explaining a state in which an identification target image is enlarged or reduced at the magnification Z1, Z2, and Z3 by the image size conversion unit.

Then, as illustrated in FIG. 14, the image size conversion unit 33 enlarges or reduces an identification target image at the magnifications $Z1$, $Z3$, and $Z3$ calculated in the method described above.

As is clear from FIG. 14, an unconverted identification target image with an image size of 600× and 300 pixels is converted by the image size conversion unit 33 into images with an image sire of 1200×600 pixels, 600×300 pixels, and 300×150 pixels.

In this case, the magnification 22 is set to 1.0 by chance, and the image size is therefore the same between images before and after image size conversion. However, in the case where conversion is performed at a magnification different from 1.0, an identification target, image is converted into an image of a different size.

The candidate region setting unit 35 sets the position and the size of a candidate region which may include an identification target object in an identification target, image. The position and the size of a candidate region may be determined from an identification target image in a method based on automatic determination or a method based on a manual operation. In the method for automatically setting the position and the size of a candidate region, usually, about 1000 regions are extracted as candidate regions from a single image (for example, J R R. Uijlings, K E A. Van de Sande, T. Gevers, and A S M. Smeulders, "Selective Search for Object Recognition.", IJCV, 2013).

The image size selection unit 36 selects, from among identification target images of plural image sires stored in the identification target image storing unit 34, an identification target image of an image sire with which in the case where a candidate region at a position and of a size set by the candidate region setting unit 35 is cut out, the sire of the cut-out candidate region is closest to a fixed sire to which images of identification target regions are unified in the case of generating a learning model, such a size with which the short side length X (50 pixels).

The short side length of an identification target region in the case of generating a learning model is set to as close to the short side length of a candidate region as possible because a difference in the size between an image in the case of generating a learning model and an identification target image degrades the accuracy of identification.

The image features extraction unit 37 extracts, from an identification target image of an image size selected by the image size selection unit 36, an image feature representing a feature of an image of a candidate region at a position and of a size set by the candidate region setting unit 35.

Furthermore, the image features extraction unit 37 extracts in advance image features of the entire identification target images of plural image sizes stored in the identification target image storing unit 34, and generates an image feature of a candidate region based on an image feature of the entire identification target image of the image size selected by the image size selection unit 36.

The determination unit 38 determines a target object included in an image of a candidate region, based on the image features extracted by the image features extraction unit 37 and the learning model stored in the learning model storing unit 32.

Next, an operation of the image processing apparatus 10 according to an exemplary embodiment will be described below with reference to drawings.

Figure 15:
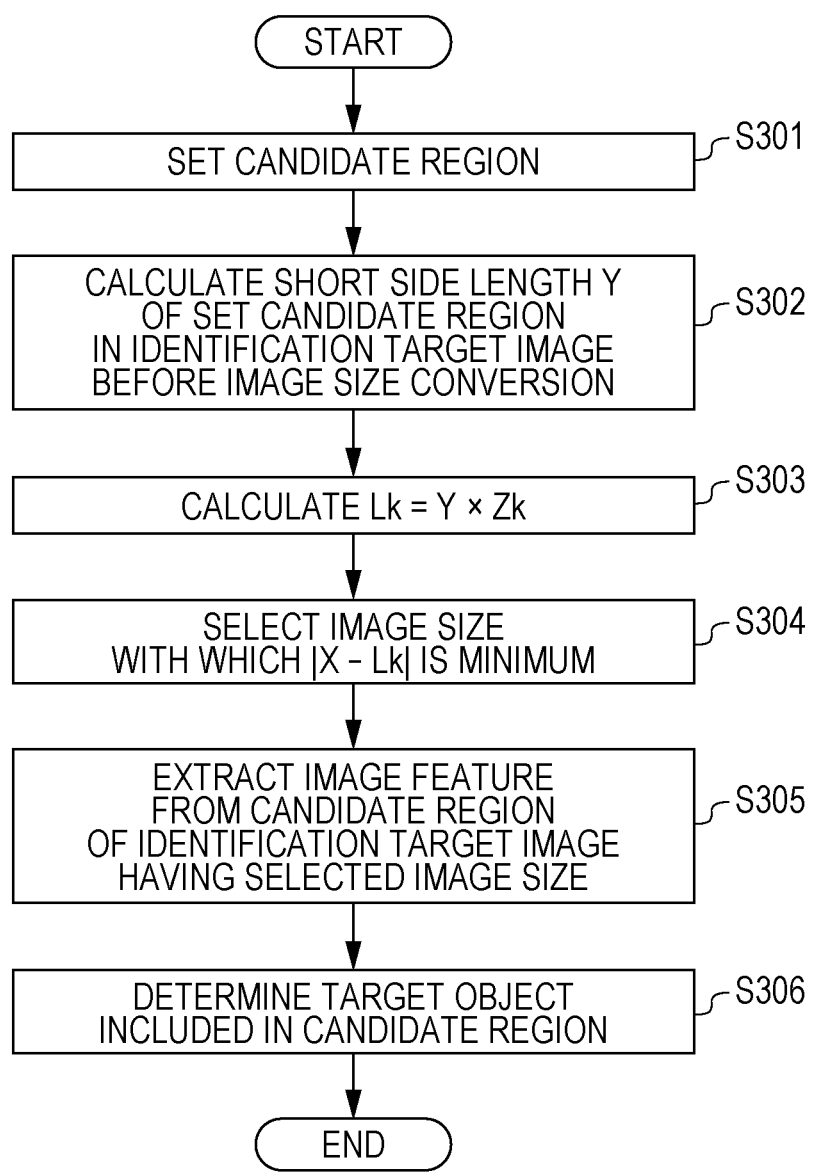
FIG. 15 is a flowchart for explaining an operation of an object identification process of an image processing apparatus according to an exemplary embodiment of the present invention.

FIG. 15 is a flowchart for explaining an operation of an object identification process by the image processing apparatus 10 according to an exemplary embodiment.

The explanation provided below is based on the assumption that before the process of the flowchart illustrated in FIG. 15 is executed, the image size conversion unit 33 determines the magnifications $Z1$ to $Z3$ for enlarging or reducing an identification target image and three types of identification target images obtained by image size conversion at the magnifications $Z1$ to $Z3$ are stored in the identification target image storing unit 34. The original identification target image before image size conversion is not performed by the image size conversion unit 33 is also stored in the identification target image storing unit 34.

Furthermore, the image features extraction unit 37 extracts in advance image features of ail the three types of identification target images of different image sizes stored in the image features extraction unit 37.

In the above state the candidate region setting unit 35 sets a candidate region in an identification target image (step S301).

Then, the image size selection unit 36 calculates the short side length Y of the set candidate region in the original identification target image (step S302). Then, the image size selection unit 36 calculates the short side length of candidate regions in identification target images obtained by image size conversion, by performing an arithmetic operation Lk=Y×Zk (k=1 to 3) (step S303).

Then, the image size selection unit 36 calculates the absolute value |X−Lk| of the difference from the short side length 50 (pixels) set when identification target regions are unified to a fixed size, and selects, for each candidate region, an image size with which the minimum absolute value is obtained (step S304).

Figure 16:
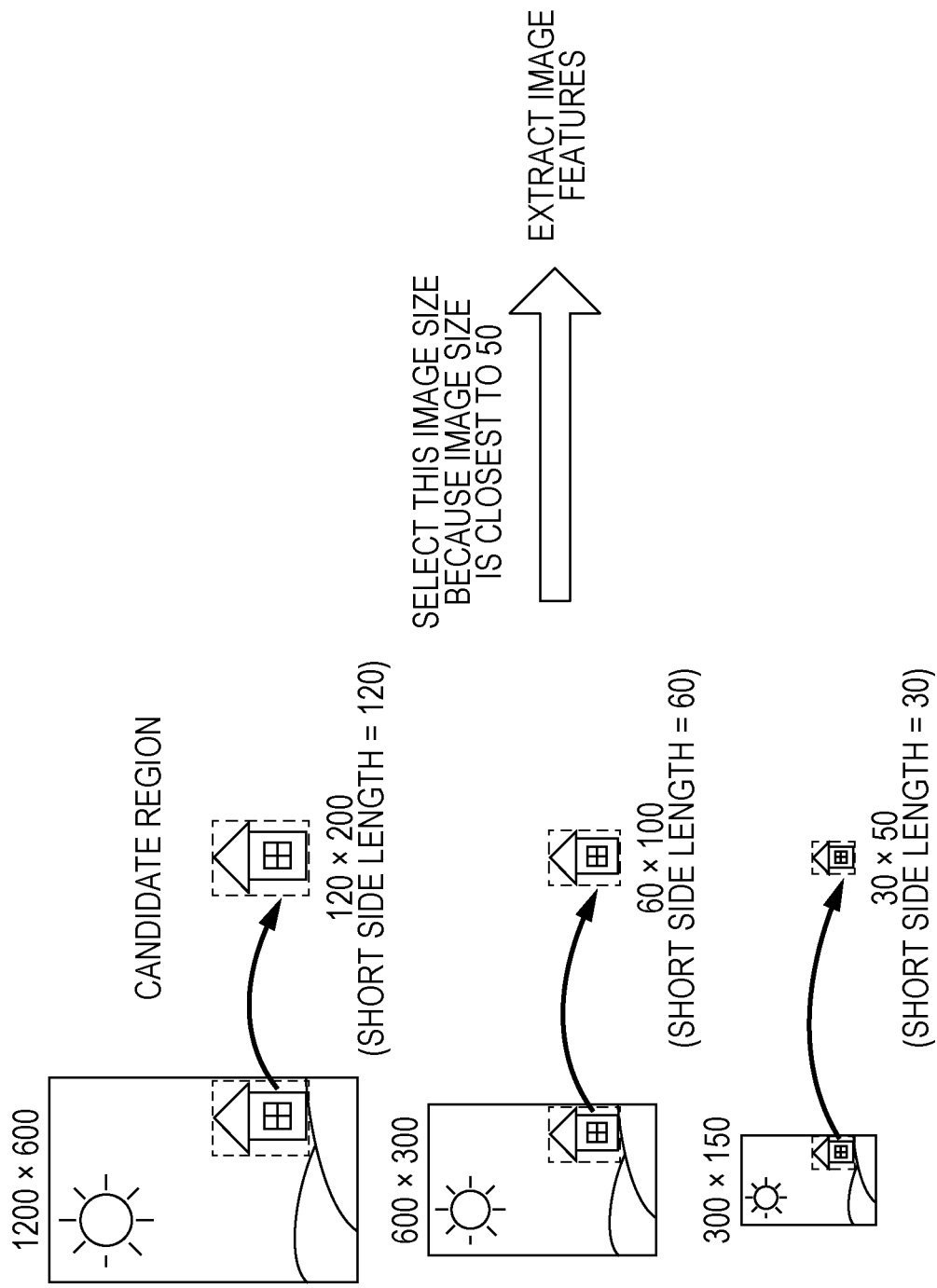
FIG. 16 is a diagram for explaining a state in which an image size selection unit selects an image size with which the short side length of a candidate region is closest to 50.

Specifically, the image size selection unit 36 selects an image size with which the short side length of a candidate region in an identification target image is closest to 50, as illustrated in FIG. 16. In the example illustrated in FIG. 16, a case where an image of a house is selected as a candidate region, and an identification target image of the second size is selected because the short side length of the candidate region in the identification target image of the second size is 60, is illustrated.

Then, the image features extraction unit 37 extracts an image feature from a candidate region in the identification target image of the image size selected by the image size selection unit 36 (step S305).

Finally, the determination unit 38 calculates a score (probability value) representing a degree in which each object is included in the candidate region, based on the learning model, stored in the learning model storing unit. 32 and the image features extracted by the image features extraction unit 37, and determines, based on the score, an object included in the candidate region (step S306). Then, based on a result of the determination by the determination unit 38, label information to be provided to the candidate region is determined.

For determination of the label information, the name of an object having the highest score may be set as label information of the candidate region, or the names of ail the objects having a score equal to or higher than a predetermined threshold may foe set as label information. In contrast, if scores for air the objects are below the threshold, no label information may foe provided to the candidate region. In the case where an object having the highest score in each candidate region ri is represented by ci and the score for the object ci is represented by P(ci|ri), the top N pieces of P(ci|ri) may be selected as the final identification result or only P(ci|ri) equal to or more than the threshold may fee selected. Furthermore, in the case where instead of providing label information to a candidate region, the final identification result is provided to the entire identification target image, the object ci selected in the above method may be set as label information of the entire image.

The image features extraction unit 37 calculates in advance and holds image features of the entire images of the three identification target images obtained by image size conversion by the image sire conversion unit 33, in this case, the image features extraction unit 37 calculates in advance features of the entire images such that an image feature of a candidate region of a rectangular shape whose upper left position is (0, 0) lower right position is (wi, hi) may be calculated using a function of f(wi, hi). Thus, when the position and the size of the candidate region is specified, the image features extraction unit 37 may calculate the image feature without calculating again the image feature of the candidate region.

Figure 17:
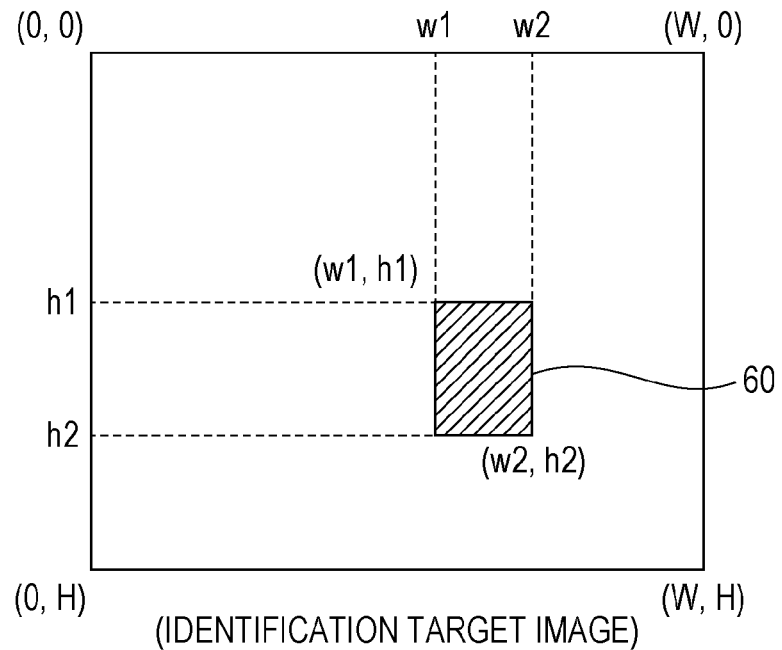
FIG. 17 is a diagram for explaining a state in which an image feature of a rectangular candidate region surrounded by positions (w1, h1) and (w2, h2) is calculated.

Specifically, as illustrated in FIG. 17, in the case where an identification target image is an image of W×H pixels and all the image features of rectangular candidate regions whose upper left position is (0, 0) and lower right position is (wi, hi) as described axe calculated in advance, an image feature of a rectangular candidate region 60 surrounded by positions (w1, h1) and (w2, h2) may be calculated by f(w2, h2)−f(w1, h2)−f<(w2, h1)−f(w1, h1).

Therefore, even for extracting an image feature of a candidate region in an identification target image of an image size selected by the image size selection unit 36, the image features extraction unit 37 may obtain the image feature of the candidate region with a less amount, of calculation by using the image features of the entire identification target image calculated in advance, without calculating the image feature from the image of the candidate region.

Reasons why an image feature of a candidate region may be calculated as described will be explained with reference to FIGS. 18 to 21.

Figure 18:
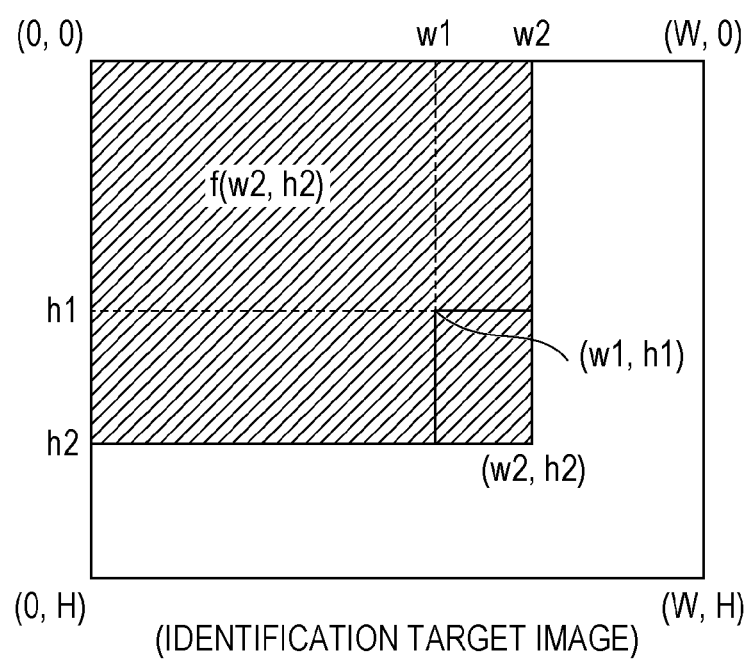
FIG. 18 is a diagram for explaining a state in which an image feature f(w2, h2) of a rectangular whose upper left position is (0, 0) and lower right position is (w2, h2) is calculated.
Figure 19:
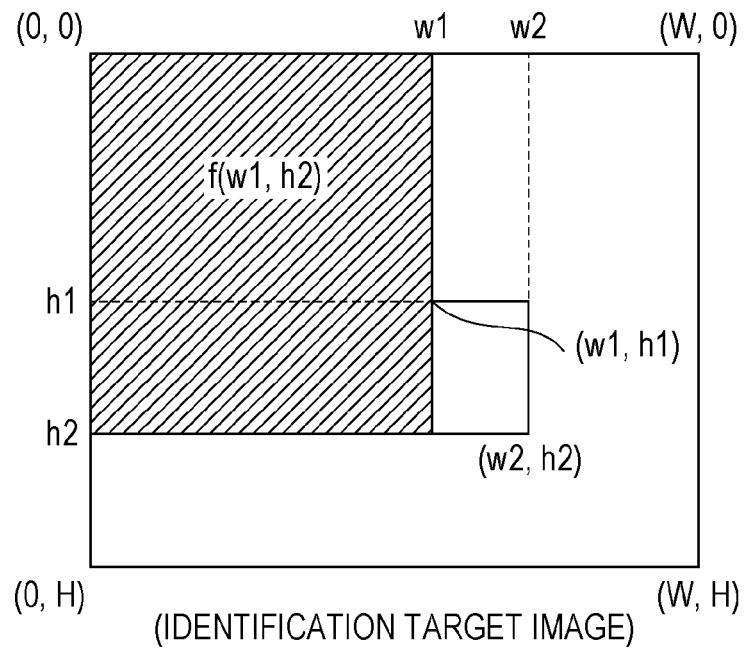
FIG. 19 is a diagram for explaining a state in which an image feature f(w1, h2) of a rectangular whose upper left position is (0, 0) and lower right position is (w1, h2) is calculated.
Figure 20:
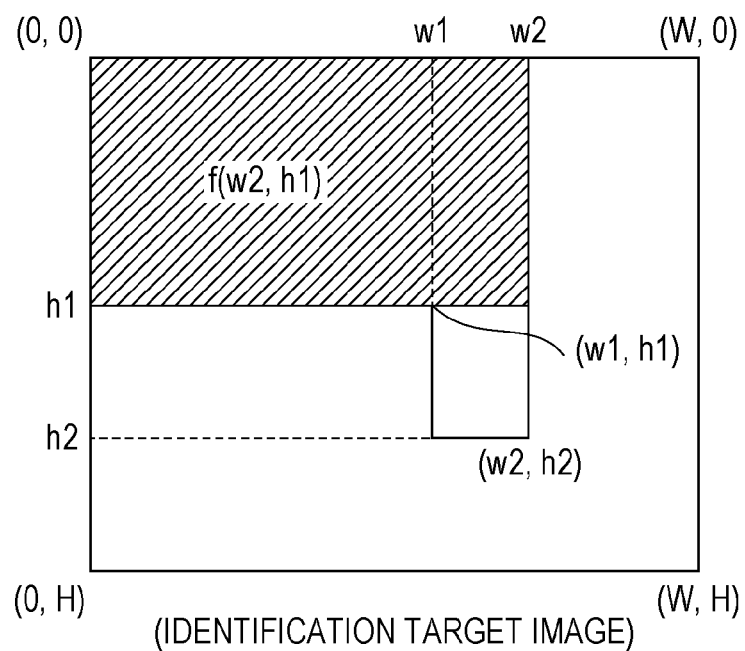
FIG. 20 is a diagram for explaining a state in which an image feature f(w2, h1) of a rectangular whose upper left position is (0, 0) and lower right position is (w2, h1) is calculated.
Figure 21:
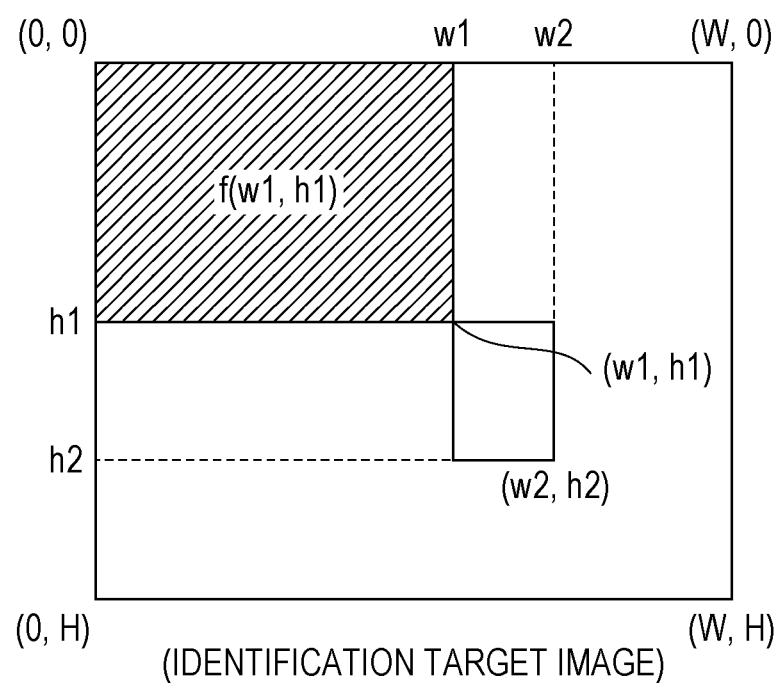
FIG. 21 is a diagram for explaining a state in which an image feature f(w1, h1) of a rectangular whose upper left position is (0, 0) and lower right position is (w1, h1) is calculated.

First, an image feature of a rectangular whose upper left position is (0, 0) and lower right position is f(w2, h2) is calculated based on f(w2, h2), as illustrated in FIG. 18. An image feature of a rectangular whose upper left position is (0, 0) and lower right position is (w1, h2) is calculated based on f(w1, h1), as illustrated in FIG. 19. An image feature of a rectangular whose upper left position is (0, 0) and lower right position is (w2, h1) is calculated based on f(w2, h1), as illustrated in FIG. 20. An image feature of a rectangular whose upper left position is (0, 0) and lower right position is f(w1, h1) is calculated based on f(w1, h1), as illustrated in FIG. 21.

Therefore, the image feature of the image of the candidate region 60 illustrated in FIG. 17 may be calculated in a method for calculating an area, by subtracting the image features f(w1, h2) and f(w2, h1) from the image feature f(w2, h2) and adding the image features f(w1, h1) to the obtained result.

The image processing apparatus 10 according to this exemplary embodiment described above is characterized in that the image size of a large number of identification target regions cut out from an identification target learning image is converted into three different image sizes in advance and image features are obtained from the images of the three different sizes, instead of enlarging or reducing the image sizes to a predetermined fixed size X as illustrated in FIG. 4 and extracting image features from the enlarged or reduced images.

In the case where image sizes of a large number of identification target regions cut out from an identification target learning image are increased or reduced to a predetermined fixed size and then the enlarged or reduced images are extracted, when, for example, 1000 identification target regions are cut out from a single identification target image, enlargement and reduction magnifications are calculated for the 1000 identification target regions and enlargement and reduction processing is performed. After that, image features are extracted. Therefore, for extraction of image features using the above method, the calculation load for image processing increases, and it takes time to identify an object.

Consequently, in the image processing apparatus 10 according to this exemplary embodiment, an identification target image is converted to have three different image sizes in advance, one of images of the three different sizes is selected for an image of each identification target region, and an image feature of the image of the identification target region is calculated based on an image feature extracted in advance for the selected image.

As described above, if the image feature amount of all the images having a fixed size is extracted in advance, only a lower image processing load is used for calculating an image feature of a partial image included in an image of the fixed size.

Therefore, with the image processing apparatus 10 according to this exemplary embodiment, compared to the case where image features are extracted with enlargement or reduction of an image of each identification target region cut out from an identification target image, the image feature ox the image of each identification target region may be calculated with a lower image processing load.

<Modifications>

In the foregoing exemplary embodiment, the case where an image feature is extracted from a candidate region, a score for each object is calculated based on the extracted image feature, and a determination as to an object included in the candidate region is performed has been described. However, in the case where regional features are used as image features, a score may be directly calculated without extracting image features.

Figure 22:
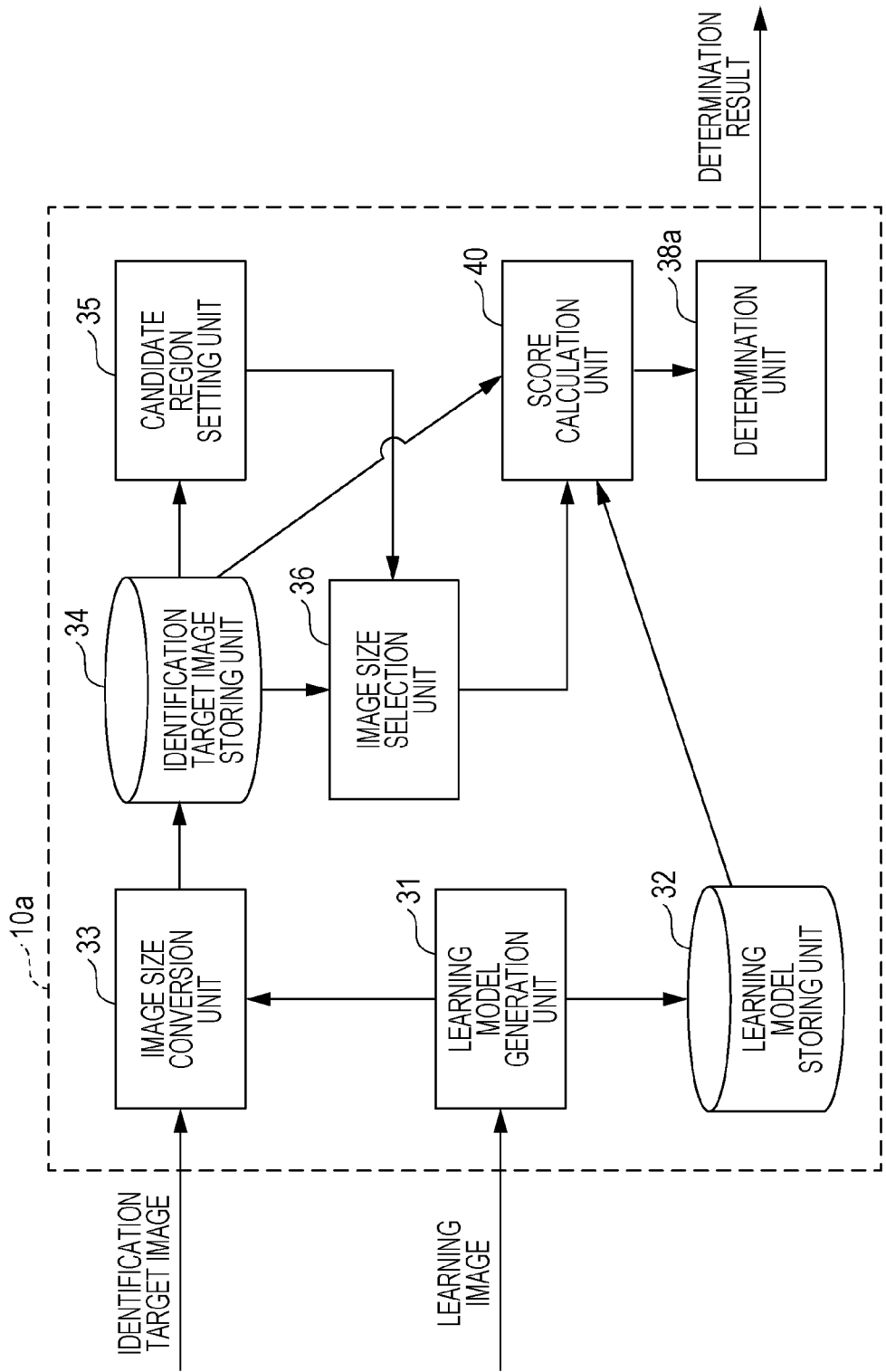
FIG. 22 is a block diagram illustrating a functional configuration of an image processing apparatus according to a modification of an image forming apparatus according to an exemplary embodiment of the present invention.

A functional configuration of an image processing apparatus 10a for performing the above processing is illustrated in FIG. 22.

As illustrated in rig. 22, the image processing apparatus 10a has a configuration in which the image features extraction unit 37 is replaced with a score calculation unit 40 and the determination unit 38 is replaced with a determination unit 38a, with respect to the image processing apparatus TO illustrated in FIG. 2.

The score calculation unit 40 in the above configuration, a partial region Pi of a rectangular shape whose upper left position is (0, 0) and lower right position is (Wi, Hi) is created from identification target images of different image sizes stored in the identification target image storing unit 34, and a score S(Fi|ci) is calculated from a regional image features Fi (=f1, f2, . . . , and fn) whose center present in the partial region Pi and a learning model. The score S(Fi|ci) may be calculated using equation 1.

$$S(Fi \mid c_i) = \sum_{j=1}^{n} \log(P(f_j \mid c_i)) + \log P(c_i) \quad \text{[Math. 1]}$$

P(f|c) may be obtained by adopting a generation model as a learning model, and P(c) represents a prior probability of an object c. Therefore, the score S(Fi|ci) may be calculated using the above equation.

By performing the above calculation in advance, the score calculation unit 40 directly calculates a score for a candidate region of an identification target image of an image size selected by the image size selection unit 36. With this configuration, the candidate region is set and a score may be calculated at the same time as selection of an image size. Therefore, identification processing may be achieved more quickly. The determination unit 38a determines label information to be provided to an image of the candidate region using a method similar to that described above, based on a score for an identification target object calculated by the score calculation unit 40.

The foregoing description of the exemplary embodiments of the present invention has been provided for the purposes of illustration and description. It is not intended to be exhaustive or to limit the invention to the precise forms disclosed. Obviously, many modifications' and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
a unifying unit that unifies images of identification target regions cut out from a learning image for which a state on whether or not an identification target object is included is already known to a predetermined fixed size;
a memory that stores a learning model which is generated based on feature information extracted from images of the identification target regions that have been unified to the fixed size by the unifying unit and used for determining a probability that the target object is included in the images;
a storing unit that stores identification target images converted into images of different image sizes;
a setting unit that sets a position and a size of a candidate region which is likely to include an identification target object of an identification target image;
a selecting unit that selects, in a case where the candidate region at the position and of the size set by the setting unit is cut out from the identification target images of the different image sizes stored in the storing unit, an identification target image of an image size with which the size of the cut-out candidate region is closest to the fixed size to which the images of the identification target regions are unified when the learning model is generated;
an extracting unit that extracts, from the identification target image of the image size selected by the selecting unit, feature information indicating a feature of the image of the candidate region at the position and of the size set by the setting unit; and
a determining unit that determines a target object included in the image of the candidate region, based on the feature information extracted by the extracting unit and the learning model stored in the memory.

2. The image processing apparatus according to claim 1, wherein the extracting unit extracts in advance feature information of the entire identification target images of the different image sizes stored in the storing unit and generates feature information of the image of the candidate region, based on the feature information of the entire identification target image of the image size selected by the selecting unit.

3. The image processing apparatus according to claim 1, further comprising:
a converting unit that converts in advance an identification target image into images of different image sizes, wherein the converting unit sets the different image sizes of the images into which the identification target image is to be converted, based on a degree of variations in the image size of candidate regions in the identification target image.

4. The image processing apparatus according to claim 2, further comprising:
a converting unit that converts in advance an identification target image into images of different image sizes, wherein the converting unit sets the different image sizes of the images into which the identification target image is to be converted, based on a degree of variations in the image size of candidate regions in the identification target image.

5. The image processing apparatus according to claim 3, wherein the converting unit sets the different image sizes of the images into which the identification target image is to be converted, based on a maximum value and a minimum value of the image size of candidate regions in the identification target image.

6. The image processing apparatus according to claim 4, wherein the converting unit sets the different image sizes of the images into which the identification target image is to be converted, based on a maximum value and a minimum value of the image size of candidate regions in the identification target image.

7. The image processing apparatus according to claim 3, wherein the converting unit enlarges or reduces the identification target image at a magnification with which an image size of a candidate region in the identification target image with a high frequency is set to the fixed size to which the images of the identification target regions are unified when the learning model is generated.

8. The image processing apparatus according to claim 4, wherein the converting unit enlarges or reduces the identification target image at a magnification with which an image size of a candidate region in the identification target image with a high frequency is set to the fixed size to which the images of the identification target regions are unified when the learning model is generated.

9. The image processing apparatus according to claim 3, wherein the converting unit enlarges or reduces the identification target image at a magnification with which a size for equally dividing the number of identification target regions cut out from the learning image is set to the fixed size to which the images of the identification target regions are unified when the learning model is generated.

10. The image processing apparatus according to claim 4, wherein the converting unit enlarges or reduces the identification target image at a magnification with which a size for equally dividing the number of identification target regions cut out from the learning image is set to the fixed size to which the images of the identification target regions are unified when the learning model is generated.

11. An image processing apparatus comprising:
a unifying unit that unifies images of identification target regions cut out from a learning image for which a state on whether or not an identification target object is included is already known to a predetermined fixed size;
a memory that stores a learning model which is generated based on feature information extracted from images of the identification target regions that have been unified to the fixed size by the unifying unit and used for determining a probability that the target object is included in the images;
a storing unit that stores identification target images converted into images of different image sizes;
a setting unit that sets a position and a size of a candidate region which is likely to include an identification target object of an identification target image;
a selecting unit that selects, in a case where the candidate region at the position and of the size set by the setting unit is cut out from the identification target images of the different image sizes stored in the storing unit, an identification target image of an image size with which the size of the cut-out candidate region is closest to the fixed size to which the images of the identification target regions are unified when the learning model is generated;
a calculating unit that calculates in advance, for the entire identification target images of the different image sizes stored in the storing unit, an index indicating a probability that a target object is included, based on the learning model stored in the memory, and calculates a value of the index of the image of the candidate region at the position and of the size set by the setting unit, based on the value of the index of the entire identification target image of the image size selected by the selecting unit; and
a determining unit that determines a target object included in the image of the candidate region, based on the value of the index calculated by the calculating unit.

12. A non-transitory computer readable medium storing a program causing a computer to execute a process for image processing, the process comprising:
unifying images of identification target regions cut out from a learning image for which a state on whether or not an identification target object is included is already known to a predetermined fixed size;
storing a learning model which is generated based on feature information extracted from images of the identification target regions that have been unified to the fixed size and used for determining a probability that the target object is included in the images;
storing identification target images converted into images of different image sizes;
setting a position and a size of a candidate region which is likely to include an identification target object of an identification target image;
selecting, in a case where the candidate region at the set position and of the set size is cut out from the stored identification target images of the different image sizes, an identification target image of an image size with which the size of the cut-out candidate region is closest to the fixed size to which the images of the identification target regions are unified when the learning model is generated;
extracting, from the identification target image of the selected image size, feature information indicating a feature of the image of the candidate region at the set position and of the set size; and
determining a target object included in the image of the candidate region, based on the extracted feature information and the stored learning model.

* * * * *